L. WIRTZ.
CHAIN.
APPLICATION FILED NOV. 13, 1915.

1,223,652.

Patented Apr. 24, 1917.

Inventor:
Luis Wirtz
By B. Gruger
Atty.

UNITED STATES PATENT OFFICE.

LUIS WIRTZ, OF EDGBASTON, BIRMINGHAM, ENGLAND.

CHAIN.

1,223,652.  Specification of Letters Patent.  Patented Apr. 24, 1917.

Application filed November 13, 1915. Serial No. 61,367.

*To all whom it may concern:*

Be it known that I, LUIS WIRTZ, a subject of the King of Great Britain, residing at Richmond House, Poplar avenue, Edgbaston, Birmingham, in the county of Warwick, England, have invented new and useful Improvements in Chains; and I do hereby declare the following to be a clear and full and exact description of the same.

This invention comprises improvements in chains and refers to the type in which the links are connected by universal or ball joints so that they are adapted to rotate or twist relatively to each other, and in which alternate links are hollow.

In accordance with my invention the hollow links are given a cylindrical form to form extended frictional surfaces so that the chain is capable of running like wire rope in grooved pulleys in addition to being adapted for engagement with toothed or positive driving members. The hollow links are formed of two semi-cylindrical parts and the contact surfaces of the universal or ball joint between them and the shank-like links are preferably formed so that under strain the bearing surfaces in contact tend to retain the two semi-cylindrical parts together instead of tending to separate them.

I further secure the two half hollow links together by means of an internal ring to which they are riveted, or other suitable means.

In order that the invention may be thoroughly understood and easily carried into practice, I have appended hereunto a sheet of explanatory drawings, in which:—

Figure 1:
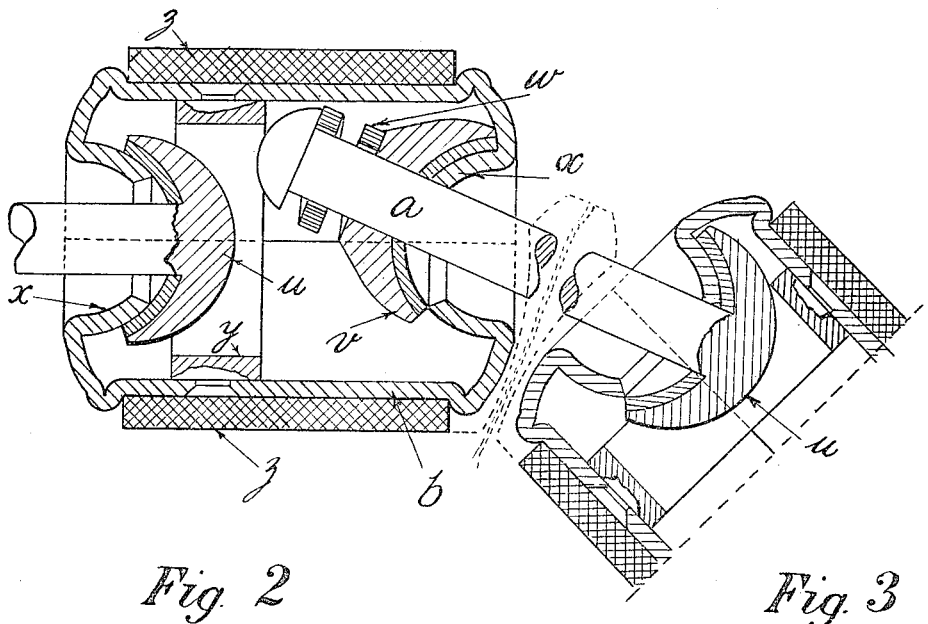
Figure 1 is a central section of a small portion of a length of chain constructed in accordance with my invention and drawn to a relatively large scale.

In accordance with the invention I form the improved chain of two classes of links; one class of links being solid, formed from round iron or steel of sufficient section to stand the tensile strain required, and with suitable heads or abutments or shoulders at the ends, and the other class of links being hollow, and cylindrical, formed of two semi-cylindrical stampings, pressings, or castings, held together by their shape and suitable means as hereinafter described. It is characteristic of the connection of links of these two classes to each other, that the contacting or bearing surfaces shall be corresponding convex and concave surfaces so that the effect of so-called ball joints may be obtained.

It may be desirable to provide for the chain to have a degree of elasticity and in this case one of the bearing surfaces on each solid link is free on the shank of the link and a spring is introduced between the end of the link and its corresponding bearing surface.

The solid links are referred to by the reference letter *a*, and the hollow cylindrical links as *b*.

I have shown the shank links *a* formed with mushroom heads *u* at one end forming concave hemispherical bearing surfaces, and at the other end they receive loose bearing pieces *v* of similar form with springs *w*, if desired, between them and heads are riveted or bumped up on the shanks *a* after the members *v* and springs *w* are in place. If desired screwed heads or nuts may replace the riveted heads. Or one or both of the heads may be formed of two separate halves pressing against a shoulder in the shank link and held together by cotters.

The hollow links *b* are divided axially and may consist of two semi-cylindrical pressings or malleable iron castings with the bearing surfaces formed internally from their end surfaces as at *x*. A liner such as *y* may be used within the cylinder on which the two semicylindrical parts may be screwed, riveted or otherwise secured, or any other method of securing the two parts together may be followed. But it will be observed that the formation of the bearing surfaces *x* and *v*, when the links are under strain, assists the means holding the two semicylindrical parts together.

The hollow links *b* may be provided with a surrounding jacket or cover *z* of leather, fiber, rubber, or any other suitable material with the object of enhancing the grip if the chain is used in a pulley without teeth, or with the object of rendering the working as silent and smooth as possible.

The advantages of the improved chain are:

(1). That the different elements composing it may rotate or twist relatively to one another without disturbing the drive in any way; this rotatability offers another advantage in that the flexibility of the chain in all directions, which this feature gives, enables the chain to drive smoothly at very great speeds over toothed members.

(2). That the chain may be used for positive drives over sprockets or for friction drives in grooves of pulleys or both together at the same time.

(3). That the chains may drive from a small sprocket to a large pulley or from a small pulley to a large one, and as toothed members may be used with them, they may be used in plurality side by side for heavy drives and when both driving and driven members are pulleys a sprocket may be used as a jockey and insure their working together and not slipping relatively to each other.

(4). That the hollow links serve to contain lubricant, and as the bearing surfaces are inclosed, the working surfaces may work in lubricant.

When a spring is introduced within the hollow link to give a degree of elasticity, the chain may be used in many cases where a positive drive is unsatisfactory at present as in a direct drive from an internal combustion engine to a pulley or chain wheel.

Figure 2:
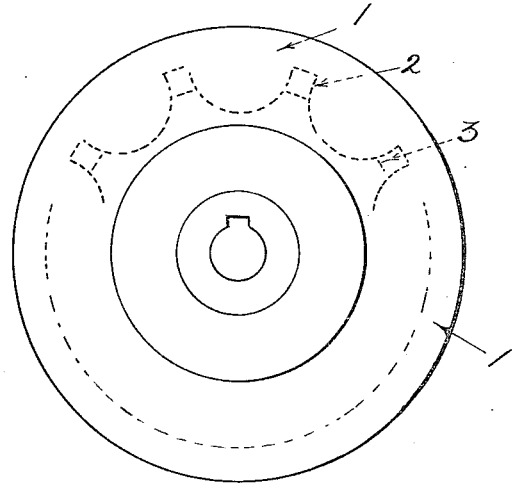
Figs. 2 and 3 are views of a suitable form of shrouded sprocket that may be used for the improved chain.
Figure 3:
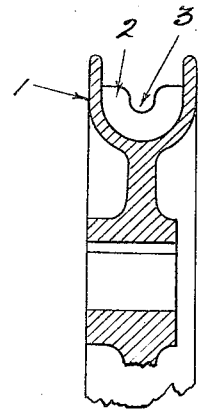

It will be observed that the curved end surfaces of the hollow links and the space between them occupied by the shank links enables the introduction of a tooth or projection between the hollow links, so that the chain is adapted for use from positive drives. The tooth or projection will preferably be of a height to extend so far as or beyond the axis of the connecting shank link, and in that case should be recessed at the center to accommodate the shank link. In Fig. 1 a tooth of a toothed sprocket is indicated in dotted lines to show its relative position to the chain in use, and in Figs. 2 and 3 I have indicated a form of shrouded sprocket in which the flanges or shrouds 1 rise above the teeth 2 and the latter are recessed for reception of the shank link as indicated at 3.

In the foregoing description where the shank links *a* are referred to as "solid" links, while I prefer this construction, it is not intended to limit the ambit of the invention to such a formation.

I claim:

1. An improved chain comprising in combination hollow links of cylindrical form and shank links with enlarged bearing parts, said hollow links being formed in separable parts and having internally convex bearing portions and said shank links having complemental surfaces for engaging said bearing portions whereby engagement between the surfaces and portions under strain tends to maintain the separable parts of the hollow links together, and securing means for said separable parts of the hollow links.

2. An improved chain comprising in combination hollow links and shank links, the hollow links being formed of two semi-cylindrical portions having end portions or flanges and each being formed with an aperture through which one of the shank links projects, said end portions being internally convex around said apertures to form bearing surfaces engaged by concave bearing parts on the shank links.

3. An improved chain comprising in combination hollow links of cylindrical form, and shank links with enlarged bearing parts, the hollow links each being formed in separable parts meeting each other parallel with the longitudinal axis of the completed link, and the bearing surfaces between the hollow links and shank links being shaped so that engagement between them under strain tends to maintain the separable parts of the hollow links together, and securing means for said separable parts of said hollow links.

Dated this 30th day of October, 1915.

In testimony whereof I affix my signature in presence of two witnesses.

LUIS WIRTZ.

Witnesses:
F. GILBERT BRETTELL,
C. T. H. WHITEHOUSE.

Copies of this patent may be obtained for five cents each, by addressing the "Commissioner of Patents. Washington, D. C."